(12) United States Patent
Yoshida et al.

(10) Patent No.: US 7,114,332 B2
(45) Date of Patent: Oct. 3, 2006

(54) CLUTCH APPARATUS FOR A HYDROSTATIC CONTINUOUSLY VARIABLE TRANSMISSION AND TRANSMISSION INCORPORATING SAME

(75) Inventors: Yoshihiro Yoshida, Saitama (JP); Nobuyuki Yakigaya, Saitama (JP); Yoshihisa Kanno, Saitama (JP); Kenji Sakakibara, Saitama (JP); Yoshiaki Tsukada, Saitama (JP); Takashi Ozeki, Saitama (JP); Takehiko Nanri, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 51 days.

(21) Appl. No.: 10/990,356

(22) Filed: Nov. 16, 2004

(65) Prior Publication Data
US 2005/0144940 A1    Jul. 7, 2005

(30) Foreign Application Priority Data
Nov. 28, 2003  (JP)  ............................. 2003-398473

(51) Int. Cl.
*F16D 39/00* (2006.01)
(52) U.S. Cl. .............................. 60/468; 60/488; 60/431
(58) Field of Classification Search .................. 60/431, 60/435, 436, 459, 462, 464, 468, 483, 487, 60/488, 489, 494; 192/38
See application file for complete search history.

(56) References Cited
U.S. PATENT DOCUMENTS

| | | | | |
|---|---|---|---|---|
| 4,916,901 A | * | 4/1990 | Hayashi et al. | ................ 60/489 |
| 5,060,477 A | * | 10/1991 | Hayashi et al. | ................ 60/488 |
| 5,065,578 A | * | 11/1991 | Nakajima et al. | ............. 60/464 |
| 5,575,151 A | * | 11/1996 | Hayashi et al. | ................ 60/489 |

FOREIGN PATENT DOCUMENTS

| | | |
|---|---|---|
| JP | 03089058 | 4/1991 |
| JP | 06042446 | 2/1994 |
| JP | 09100909 | 4/1997 |

* cited by examiner

*Primary Examiner*—Igor Kershteyn
(74) *Attorney, Agent, or Firm*—Carrier, Blackman & Associates, P.C.; William D. Blackman; Joseph P. Carrier

(57) ABSTRACT

A hydrostatic continuously variable transmission includes a hydraulic pump and a hydraulic motor, supported by a common support shaft, and hydraulically connectable to each other through a hydraulic circuit including an inside passage and an outside passage. A clutch device includes a valve spool, which is slidably disposed in a hollow internal bore formed in the transmission support shaft. The valve spool is operable to make or interrupt fluid communication between the inside passage and the outside passage, according to the movement thereof. A governor mechanism is mounted to a pump casing of the hydraulic pump, and the governor mechanism generates a governor force corresponding to the rotating speed of a clutch cap, by use of centrifugal force generated by the rotation thereof. The valve spool is effectively moved in the hollow internal bore, using the governor force generated from the governor mechanism, to engage or disengage the clutch.

18 Claims, 6 Drawing Sheets

CLUTCH APPARATUS FOR A HYDROSTATIC CONTINUOUSLY VARIABLE TRANSMISSION AND TRANSMISSION INCORPORATING SAME

CROSS-REFERENCE TO RELATED APPLICATIONS

The present invention claims priority under 35 USC 119 based on Japanese patent application No. 2003-398473, filed Nov. 28, 2003. The disclosure of Japanese patent application No. 2003-398473 is incorporated by reference.

BACKGROUND OF THE INVENTION

1. Field of the Invention

The present invention relates to a hydrostatic continuously variable transmission including a hydraulic pump and a hydraulic motor connected to each other through a hydraulic closed circuit, and configured so that the capacity of the hydraulic pump or the hydraulic motor is variably controlled, to vary the speed of input rotation of the hydraulic pump and to take out the speed-varied rotation as output rotation of the hydraulic motor. More particularly, the present invention relates to a clutch device for making and interrupting the communication between a high pressure side oil passage and a low pressure side oil passage, constituting the hydraulic closed circuit in the hydrostatic continuously variable transmission.

2. Description of the Background Art

Various types of hydrostatic continuously variable transmissions have been known and put to practical use. One example of a commercial hydraulic continuously variable transmission was sold by Honda and marketed under the trademark "Hondamatic" on the 2001 Honda Fourtrax Foreman Rubicon™ TRX500 ATV.

Another example of a hydrostatic continuously variable transmission is disclosed in Japanese Laid-open Patent No. Hei 6-42446, proposed by the present applicant.

Other examples of known hydrostatic continuously variable transmissions can be found in Japanese Patent No. 2920772 and Japanese Laid-open Patent No. Hei 9-100909. The hydrostatic continuously variable transmission disclosed in these Patent Documents generally includes a swash plate plunger pump, a swash plate plunger motor, and a hydraulic closed circuit for connecting the discharge port and the suction port of the swash plate plunger pump to the suction port and the discharge port of the swash plate plunger motor, respectively. This transmission is configured so that a pump swash plate member is driven by the engine, wherein a pump cylinder and a motor cylinder are connected to each other and disposed on an output shaft, a motor swash plate member is restricted in rotation, and the motor swash plate angle can be variably regulated.

It has been also known that, in the hydrostatic continuously variable transmission configured as above, a clutch valve is provided for making and interrupting fluid communication between a high pressure side oil passage and a low pressure side oil passage constituting the hydraulic closed circuit. The magnitude of transmission of a rotational drive force from the hydraulic pump to the hydraulic motor is controlled using the clutch valve, or a clutch control is conducted for interrupting the transmission of the rotation. For example, in Japanese Laid-open Patent No. Hei 9-100909, an automatic clutch device using such a clutch valve is disclosed.

Meanwhile, the clutch valve provided in the hydrostatic continuously variable transmission has been configured so that its operation is controlled by an actuator, operated by hydraulic pressure generated from a hydraulic governor operated in conjunction with the engine rotation. The known clutch valve has had the problems of a relatively large structure and high cost, due to the need for the hydraulic governor, the actuator and the like.

In view of this, the automatic clutch device described in Japanese Laid-open Patent No. Hei 9-100909 is configured so that the hydraulic pressure in the low pressure side oil passage urges the clutch valve in the opening direction, and the hydraulic governor for increasing a supplied hydraulic pressure supplied to the low pressure side oil passage according a rise in the input rotating speed of the hydraulic pump is connected thereto, to thereby eliminate the need for an exclusive-use actuator, and to provide a simplified structure. However, since the operation of the clutch valve is controlled by the hydraulic pressure using the hydraulic governor, this limits the manufacturer's ability to make the device smaller and compact and to limit the cost. A need still exists for a device which a further simplifies the structure of a clutch for this type of transmission.

SUMMARY OF THE INVENTION

The present invention has been made in consideration of the above problems. Accordingly, it is an object of the present invention to provide a clutch device which is configured to be relatively small and compact, and in which the operation of a clutch valve can be mechanically controlled.

In order to attain the above object, according to the present invention, a clutch device for a hydrostatic continuously variable transmission is provided, where the transmission includes a hydraulic pump and a hydraulic motor connected to each other through a hydraulic closed circuit. The continuously variable transmission is configured so that the capacity of either the hydraulic pump or the hydraulic motor is variably controlled, to vary the speed of input rotation of the hydraulic pump and to take out the speed-varied rotation as output rotation of the hydraulic motor.

A clutch device according to a first illustrative embodiment of the invention includes: a valve spool which is movably disposed in an internal bore formed to extend in the axial direction in a support shaft (such as, for example, a transmission output shaft) for rotatably supporting the hydraulic pump and the hydraulic motor, and which regulates fluid communication between a high pressure side oil passage and a low pressure side oil passage constituting the hydraulic closed circuit, according to the movement thereof.

The clutch device according to the first embodiment also includes a governor mechanism which is operatively associated with the hydraulic pump, and which is operable to generate a governor force corresponding to the rotating speed of a clutch cap, by use of a centrifugal force generated by the rotation of the clutch cap. The valve spool is moved in the internal bore of the support shaft by use of the governor force generated from the governor mechanism.

In this first embodiment, the governor mechanism includes a centrifugal force conversion mechanism, for converting a centrifugal force, generated by the rotation of the clutch member, into the governor force in the axial direction. The governor mechanism applies the governor force to the valve spool in the axial direction, so as to move the valve spool in a direction to interrupt the fluid communication between the high pressure side oil passage and the low pressure side oil passage. The governor mechanism also includes a spring for urging the valve spool in the direction for permitting fluid communication between the high pressure side oil passage and the low pressure side oil passage; and a hydraulic force generating mechanism for applying an axial pushing force, generated by the hydraulic pressure inside the high pressure side oil passage, to the valve spool to move it in the direction for permitting fluid communication between the high pressure side oil passage and the low pressure side oil passage.

In addition, in the clutch device, the support shaft may be provided with high pressure and low pressure branch passages communicated respectively with the high pressure side oil passage and the low pressure side oil passage constituting the hydraulic closed circuit. The high pressure and low pressure branch passages may open into the internal bore, and the valve spool is movable in the internal bore of the support shaft, to make or interrupt the communication between the high pressure and low pressure branch passages, thereby making or interrupting the communication between the high pressure side oil passage and the low pressure side oil passage.

In addition, a forcible operation device may be provided as part of the clutch device hereof, for forcibly moving the valve spool in the internal bore, irrespective of the governor force generated from the governor mechanism. In this case, the forcible operation device is operable to forcibly move the valve spool in the internal bore, so as to interrupt fluid communication between the high pressure side oil passage and the low pressure side oil passage, when the rotary speed of an engine for driving the hydraulic pump is low, and the rotary speed of a wheel, driven by the hydraulic motor, becomes high.

According to the clutch device of the present invention configured as above, the valve spool is moved in the internal bore by the governor force generated by the governor mechanism, so as to make or interrupt the communication between the high pressure side oil passage and the low pressure side oil passage, so that the operation of the clutch can be controlled mechanically, the device configuration is simple and easy to reduce in size, and the operation of the clutch can be easily controlled.

Furthermore, the governor mechanism can be disposed at an end portion of the clutch assembly, so that the setting of operations and the maintenance of the governor mechanism are easy to carry out.

In this case, the governor mechanism preferably includes the centrifugal force conversion mechanism, the spring and the hydraulic pressure giving mechanism as above-mentioned, whereby it is possible to perform such a control as to connect the clutch according to an increase in pump input rotation (engine speed) by opening the clutch when the pump input rotation is low, and to perform a fine control of the connection of the clutch according to the hydraulic pressure difference between the high pressure side oil passage and the low pressure side oil passage, i.e., according to the torque transmitted from the hydraulic pump and the hydraulic motor.

In addition, when the support shaft is provided with the high pressure and low pressure branch passages communicated respectively with the high pressure side oil passage and the low pressure side oil passage constituting the hydraulic closed circuit and the communication between the high pressure and low pressure branch passages is made and interrupted by the valve spool, it is possible to further simplify the device.

In addition, when the forcible operation device for forcibly moving the valve spool in the internal bore irrespectively of the governor force generated from the governor mechanism is provided, it is possible to forcibly operate the clutch as required, without being affected by the rotation of the clutch member. For example, it is possible to perform such a control as to operate engine brake by interrupting the communication between the high pressure side oil passage and the low pressure side oil passage through forcibly moving the valve spool in the internal bore when the speed of the engine for driving the hydraulic pump is at a low rotation and the rotation of a wheel driven by the hydraulic motor reaches a high rotation.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION

Now, selected illustrative embodiments of the present invention will be described below referring to the figures. It should be understood that only structures considered necessary for clarifying the present invention are described herein. Other conventional structures, and those of ancillary and auxiliary components of the system, are assumed to be known and understood by those skilled in the relevant art.

Figure 2:
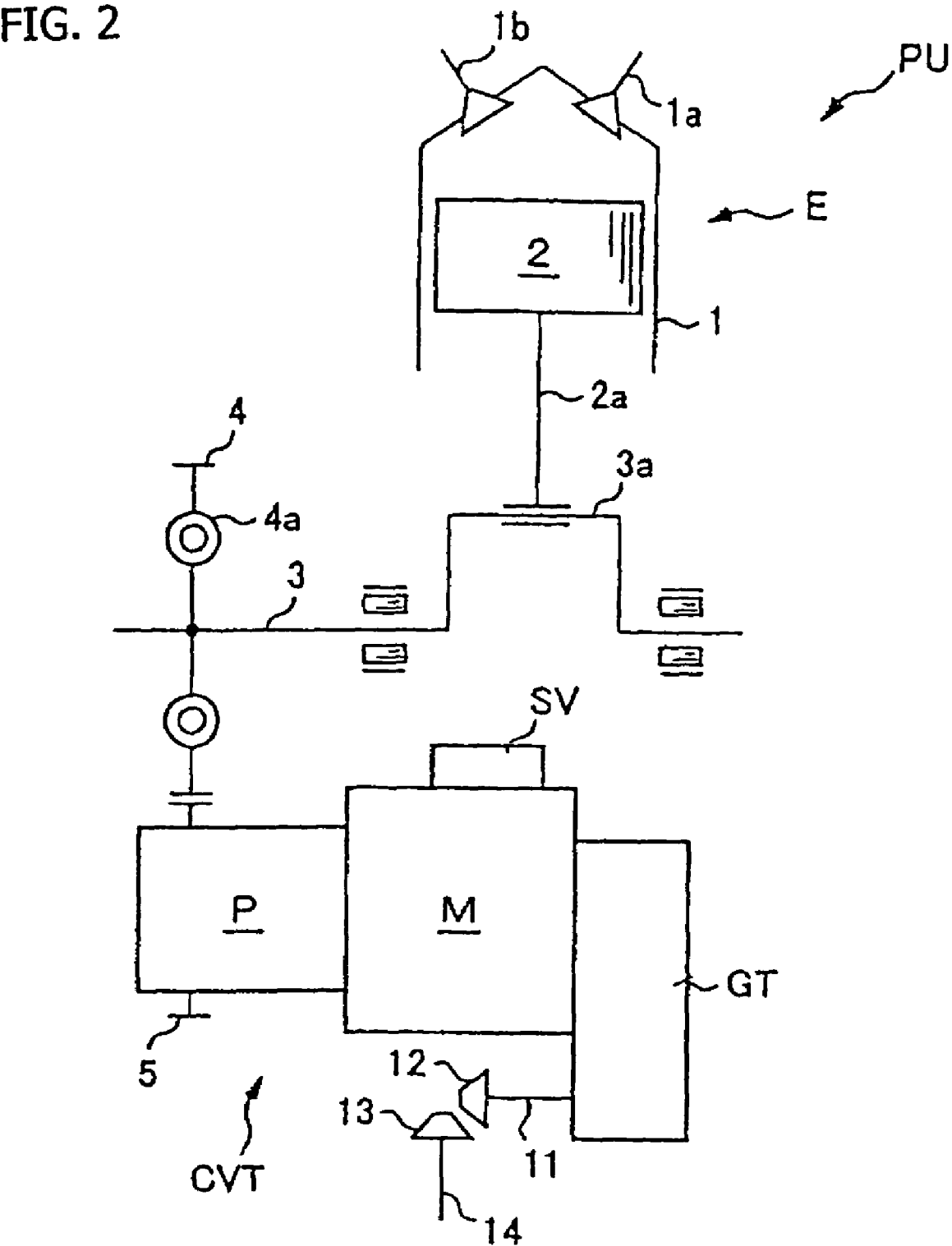
FIG. 2 is a simplified schematic diagram of a system according to the present invention, showing the configuration of a powertrain unit including the hydrostatic continuously variable transmission.

FIG. 2 is a simplified schematic diagram of a system according to the present invention, in which a powertrain unit PU includes a hydrostatic continuously variable transmission according to a first embodiment the present invention. Referring now to FIG. 2, it will be seen that the powertrain unit PU includes an engine E for generating a rotational drive force, a hydrostatic continuously variable transmission CVT for continuously varying the effective speed of the output rotation of the engine E, and a transmission gear train GT for performing direction changeover and transmission of the output rotation of the hydrostatic continuously variable transmission CVT.

The engine E includes a piston 2 disposed in a cylinder 1 having intake and exhaust valves 1a and 1b at a head portion thereof. In the engine E, the intake valve 1a and the exhaust valve 1b are opened and closed at predetermined timings, a fuel-air mixture is combusted in a cylinder chamber to reciprocate the piston 2, and the reciprocating motion of the piston 2 is transmitted through a connecting rod 2a to a crank portion 3a, whereby a crankshaft 3 is driven to rotate. An input drive gear 4 having a damper 4a is attached to an end portion of the crankshaft 3, and a rotational drive force of the crankshaft 3 is transmitted to the input drive gear 4.

The hydrostatic continuously variable transmission CVT includes a hydraulic swash plate plunger type pump P and a hydraulic swash plate plunger type motor M. An input driven gear 5 connected to a pump casing constituting the hydraulic swash plate plunger type pump P is meshed with the input drive gear 4, and the rotational drive force of the engine E is transmitted to the input driven gear 5, whereby the pump casing is driven to rotate. While the details of the hydrostatic continuously variable transmission CVT will be described later, the output rotation, after having undergone stepless (non-stage) speed change by the hydrostatic continuously variable transmission CVT, is transmitted to a transmission output shaft 6 (not shown in FIG. 2; see FIG. 1 and the like).

The transmission gear train GT is connected to the transmission output shaft 6, and the rotation of the transmission output shaft 6 is transmitted to an output drive shaft 11 (FIG. 2) through forward running-neutral changeover, speed reduction and the like by the transmission gear train GT. An output drive bevel gear 12 is attached to the tip end of the output drive shaft 11. The rotational drive force of the output drive shaft 11 is transmitted from an output driven bevel gear 13, meshed with the output drive bevel gear 12 to a drive shaft 14, and the rotational drive force is then transmitted from the drive shaft 14 to a wheel (not shown), whereby the wheel is driven.

Next, the hydrostatic continuously variable transmission CVT will be described referring to FIG. 1 and FIGS. 3 to 5.

The hydrostatic continuously variable transmission CVT includes the hydraulic swash plate plunger type pump P and the hydraulic swash plate plunger type motor M, with the transmission output shaft 6 extending through the center thereof. In addition, the transmission output shaft 6 is rotatably supported on a transmission housing HSG through ball bearings 7a, 7b, 7c.

The hydraulic pump P includes the pump casing 20, disposed on the transmission output shaft 6 in an coaxial and rotatable manner relative to the transmission output shaft, and a pump swash plate member 21, disposed in the inside of the pump casing 20 and inclined at a predetermined angle relative to the rotational center axis of the pump casing 20.

The hydraulic pump P also includes a pump cylinder 22, disposed opposite to the pump swash plate member 21, and a plurality of pump plungers 23 slidably disposed in a plurality of pump plunger holes 22a formed in the pump cylinder 22. The pump plungers 23 extend in the axial direction, substantially parallel to the center axis of the output shaft 6, in an annular arrangement surrounding the center axis of the pump cylinder 22.

The pump casing 20 is rotatably supported on the transmission output shaft 6, and the pump cylinder 22 through bearings 7b and 22c, and is rotatably supported on the transmission housing HSG through a bearing 7a. The pump swash plate member 21 is disposed to be rotatable, about an axis inclined by a predetermined angle relative to the pump casing 20, through bearings 21a, 21b. In other words, the pump cylinder 22 is borne by the bearing 22c to be coaxially rotatable relative to the pump casing 20.

The input driven gear 5 is attached to the outer circumference of the pump casing 20 by a bolt 5a. In addition, an outside end portion of the pump plunger 23 is abuttingly engaged with a swash plate surface 21a of the pump swash plate member 21, and an inside end portion located inside the pump plunger hole 22 is disposed opposite to a valve body 51 of a distribution valve 50 (described later) so as to form a pump oil chamber 23a in the pump plunger hole 22a.

In addition, a pump opening 22b, functioning as a pump discharge port and suction port, is provided at an end portion of the pump plunger hole 22a. When the input driven gear 5 is driven to rotate as above-mentioned, the pump casing 20 is also driven to rotate. The pump swash plate member 21, disposed in the inside thereof, is swung attendant on the rotation of the pump casing 20, and the pump plungers 23 are reciprocated in the pump plunger holes 22a according to the swinging movement of the swash plate surface 21a, thereby alternately discharging and sucking in a working oil inside of the pump oil chamber 23a.

Figure 1:
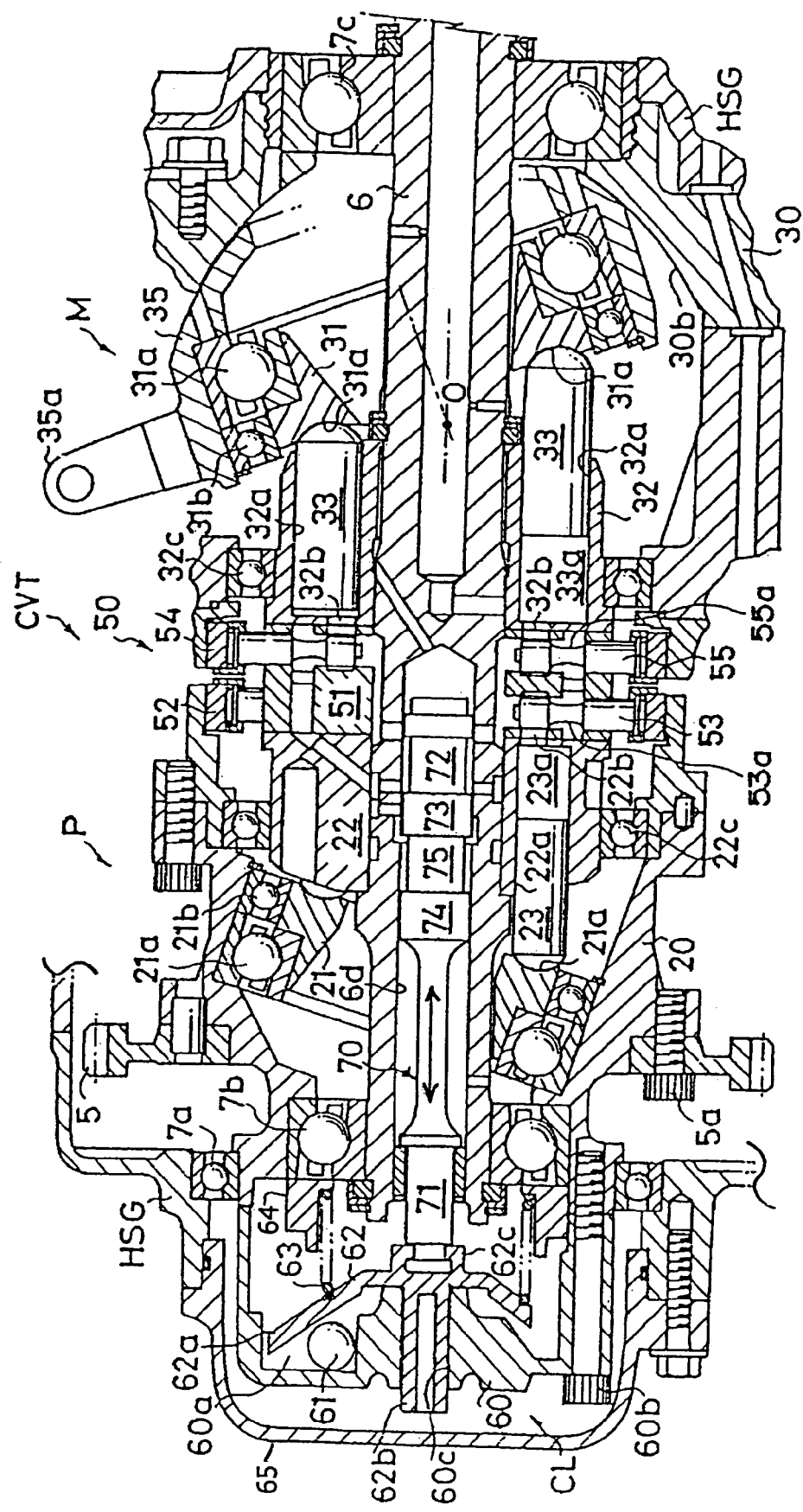
FIG. 1 is a sectional view showing the configuration of a hydrostatic continuously variable transmission according to a first illustrative embodiment of the present invention.

As seen on the right side of the drawing in FIG. 1, the hydraulic motor M includes a motor casing 30, connected to the transmission housing HSG and fixedly supported thereon. The hydraulic motor M also includes a motor swinging member 35, which is supported in sliding contact with a hollow concave support surface 30b, formed at the inside surface of the motor casing 30, and a motor cylinder 32 disposed adjacent the motor swinging member, as shown. The motor swinging member 35 is supported to be pivotally swingable about a swinging center O extending in a direction perpendicular to the center axis of the transmission output shaft 6 (a direction orthogonal to the paper surface).

An arm portion 35a, formed by protruding an end portion of the motor swinging member 35 to the outside diameter side, is protruded radially outwards and connected to a motor servo mechanism SV (see FIG. 2), such a control as to move the arm portion 35a to the left and right sides in FIG. 1 and the like is performed by the motor servo mechanism SV, and such a control as to pivotally swing the motor swinging member 35 about the swinging center O is performed. When the motor swinging member 35 is pivotally swung in this manner, the motor swash plate member 31 rotatably supported in the inside thereof is also swung together therewith, with the result that the swash plate angle thereof is varied. The hydraulic motor M also includes a motor swash plate member 31, rotatably supported in the motor swinging member 35 through bearings 31a, 31b.

An arm portion 35a, formed by protruding an end portion of the motor swinging member 35 to the outside diameter side, is protruded radially outwards and connected to a motor servo mechanism SV (see FIG. 2), such a control as to move the arm portion 35a to the left and right sides in FIG. 1 and the like is performed by the motor servo mechanism SV, and such a control as to pivotally swing the motor swinging member 35 about the swinging center O is performed. When the motor swinging member 35 is pivotally swung in this manner, the motor swash plate member 31 rotatably supported in the inside thereof is also swung together therewith, with the result that the swash plate angle thereof is varied.

The hydraulic motor M further includes a plurality of motor plungers 33, slidably disposed in a plurality of motor plunger holes 32a formed to penetrate in the axial direction through the motor cylinder 32, in an annular arrangement surrounding the center axis of the motor cylinder 32. In addition, the motor cylinder 32 is rotatably supported on the motor casing 30 through a bearing 32c, at an outer circumferential portion thereof.

A rounded outside end portion of the motor plunger 33 is protruded outwards and abuttingly engaged with a concave swash plate surface 31a of the motor swash plate member 31. An inside end portion of the motor plunger 33, located in the plunger hole 32a, is disposed opposite to a valve body 51, to define a motor oil chamber 33a in the motor plunger hole 32a. In addition, a motor opening 32b, functioning as a motor discharge port and suction port, is formed at an end portion of the motor plunger hole 32a.

Figure 4:
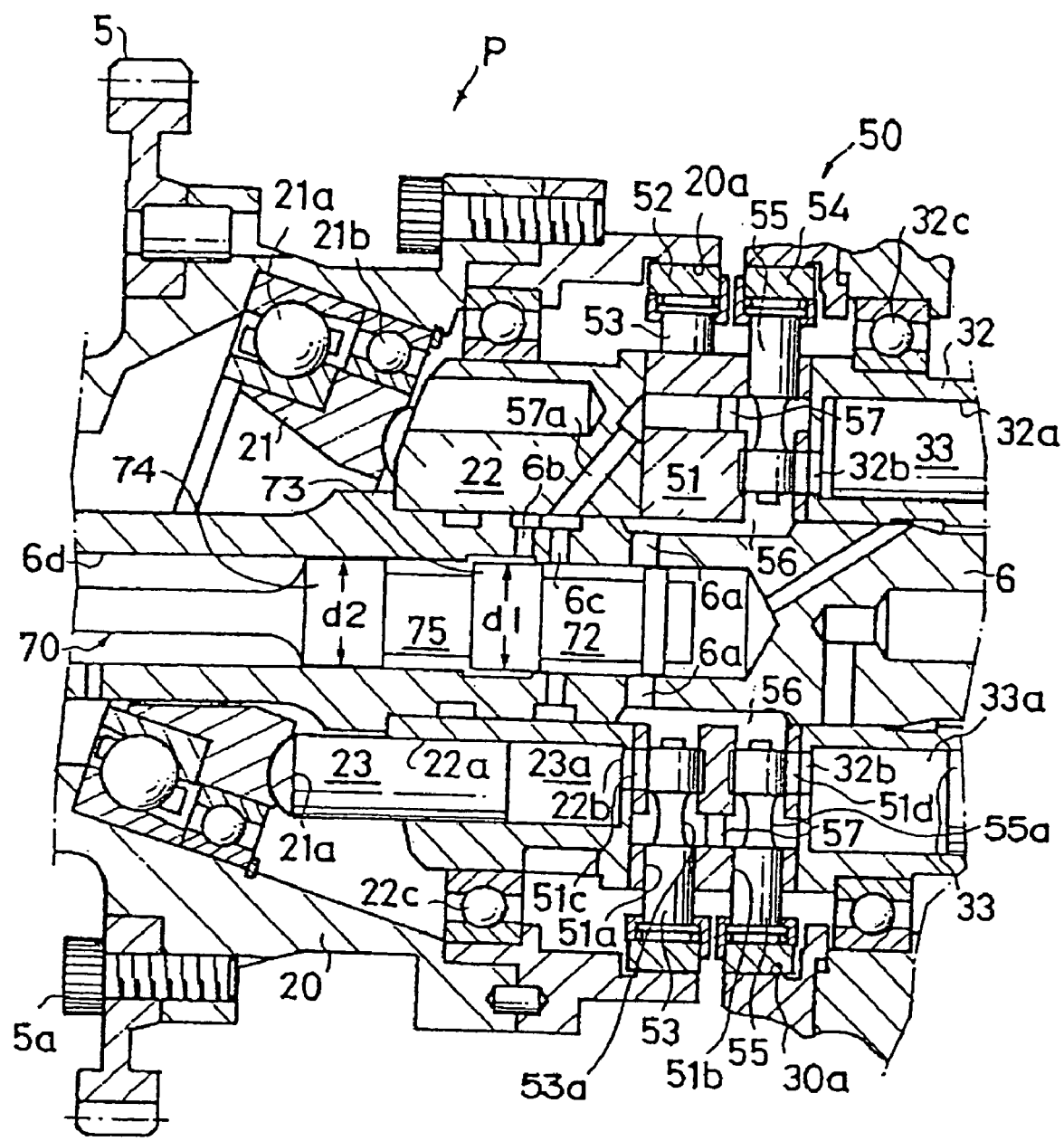
FIG. 4 is a sectional view showing enlargedly a part of the hydrostatic continuously variable transmission according to the present invention.

The distribution valve 50 is disposed between the pump cylinder 22 and the motor cylinder 32. FIG. 4 shows this portion in an enlarged manner, in which the valve body 51 of the distribution valve 50 is integrally connected by being clamped between the pump cylinder 22 and the motor cylinder 32, and is connected to the transmission output shaft 6. Therefore, the pump cylinder 22, the distribution valve 50, the motor cylinder 32 and the transmission output shaft 6 are rotated integrally together, effectively as one body.

As symbols are clearly shown particularly in FIG. 4, a plurality of pump-side hollow internal bores 51a and a plurality of motor-side hollow internal bores 51b extending in radial directions and formed at regular intervals along the circumferential direction are formed in two rows in the valve body 51 constituting the distribution valve 50. Pump-side spools 53 are slidably disposed in the pump-side hollow internal bores 51a, while motor-side spools 55 are slidably disposed in the motor-side hollow internal bores 51b.

The pump-side hollow internal bores 51a are formed in correspondence with the pump plunger holes 22a, and the valve body 51 is provided with a plurality of pump-side communication passages 51c for communication between the pump openings 22b (pump oil chambers 23a) and the pump-side hollow internal bores 51a corresponding respectively. Similarly, the motor-side hollow internal bores 51b are formed in correspondence with the motor plunger holes 32a, and the valve body 51 is provided with a plurality of motor-side communication passages 51d for communication between the motor openings 32b (motor oil chambers 33a) and the motor-side hollow internal bores 51b corresponding respectively.

In the distribution valve 50, further, a pump-side cam ring 52 is disposed at a position for surrounding an outer circumferential end portion of the pump-side spool 53, and a motor-side cam ring 54 is disposed at a position for surrounding an outer circumferential end portion of the motor-side spool 55. The pump-side cam ring 52 is fixedly mounted in an eccentric inner circumferential surface 20a, formed at a tip end inside surface of the pump casing 20 and eccentric from the rotational center axis of the tip end inside surface, and is rotated as one body with the pump casing 20. The motor-side cam ring 54 is mounted in an eccentric inner circumferential surface 30a, formed at the tip end inside surface of the motor casing 30 and eccentric from the rotational center axis of the motor cylinder 32.

In addition, the outer circumferential end of the pump-side spool 53 is relatively rotatably locked on the inner circumferential surface of the pump-side cam ring 52, and the outer circumferential end of the motor-side spool 55 is relatively rotatably locked on the inner circumferential surface of the motor-side cam ring 54.

An inside passage 56 is formed between the inner circumferential surface of the valve body 51 and the outer circumferential surface of the transmission output shaft 6, and the inner circumferential end portions of the pump-side hollow internal bores 51a and the motor-side hollow internal bores 51b are communicated with the inside passage 56. In addition, an outside passage 57 is formed inside the valve body 51, for allowing communication between the pump-side hollow internal bores 51a and the motor-side hollow internal bores 51b.

Here, operations of the distribution valve 50, configured as above, will be described. When the drive force of the engine E is transmitted to the input driven gear 5 and the pump casing 20 is driven to rotate, the pump swash plate member 21 is oscillatably swung according to the rotation. Therefore, the pump plungers 23, abuttingly engaged with the swash plate surface 21a of the pump swash plate member 21, are sequentially reciprocated in the axial direction in the pump plunger holes 22a, by the swinging of the pump swash plate member 21.

As a result of the axial movement of the pump plungers 23, a working oil is discharged from the pump oil chamber 23a through the pump openings 22b according to the inward movement of the pump plungers 23, and the working oil is sucked into the pump oil chamber 23a through the pump openings 22b according to the outward movement of the pump plungers 23.

In this instance, the pump-side cam ring 52, attached to an end portion of the pump casing 20, is rotated together with the pump casing 20, but, since the pump-side cam ring 52 is mounted to be eccentric relative to the rotational center of the pump casing 20, the pump-side spools 53 are reciprocated in the radial direction in the pump-side hollow internal bores 51a according to the rotation of the pump-side cam ring 52. When the pump-side spools 53 are thus reciprocated and the pump-side spools 53 are moved from the condition shown in FIGS. 4 and 5 to the inside diameter side, the pump-side communication passage 51c and the outside passage 57 are communicated with each other through a spool groove 53a, and, when the pump-side spools 53 are moved from the condition shown in FIGS. 4 and 5 to the outside diameter side, the pump-side passage 51c and the inside passage 56 are communicated with each other.

Here, corresponding to the swinging oscillation of the swash plate member 21, attendant on the rotation of the pump casing 20, and to the reciprocation of the pump plunger 23 between a position where it is pushed out most to the outer side (the position is called bottom dead center) and a position where it is pushed in most to the inner side (the position is called top dead center), the pump-side cam ring 52 reciprocates the pump-side spools 53 in the radial directions. As a result, when the pump plunger 23 is moved from the bottom dead center to the top dead center attendant on the rotation of the pump casing 20 and the working oil in the pump oil chambers 23a is discharged through the pump openings 22b, the working oil is fed out through the pump-side communication passage 51c into the outside passage 57. On the other hand, when the pump plunger 23 is moved from the top dead center to the bottom dead center attendant on the rotation of the pump casing 20, the working oil in the inside passage 56 is sucked into the pump oil chambers 23a through the pump-side communication passage 51 and the pump openings 22b. As is seen from this, when the pump casing 20 is driven to rotate, the outside passage 56 is supplied with the working oil discharged from the hydraulic pump P, while the working oil is sucked from the inside passage 56 into the hydraulic pump P.

On the other hand, the motor-side cam ring 54, attached to an end portion of the motor casing 30, is also mounted to be eccentric relative to the rotational center of the motor casing 30, so that, when the motor cylinder 32 is rotated, the motor-side spools 55 are reciprocated in the radial directions in the motor-side hollow internal bores 51b according to the rotation. When the motor-side spools 55 are thus reciprocated and the motor-side spools 55 are moved from the condition shown in FIGS. 4 and 5 to the inside diameter side, the motor-side communication passage 51d and the outside passage 57 are communicated with each other through a spool groove 55a, and, when the motor-side spools 55 are moved from the condition shown in FIGS. 4 and 5 to the outside diameter side, the motor-side passage 51d and the inside passage 56 are communicated with each other.

Here, as has been described above, the working oil discharged from the hydraulic pump P is being fed to the outside passage 57, and the working oil is supplied from the motor-side communication passage 51d into the motor oil chambers 33a through the motor openings 32b, whereby the motor plungers 33 are pushed axially outwards. Thus, the outside end portions of the motor plungers 33 receiving the axially outward pushing forces are configured to make sliding contact with the portion ranging from the top dead center to the bottom dead center of the motor swash plate member 31 in the condition where the motor swinging member 35 is swung as shown in FIG. 1, and the motor cylinder 32 is driven to rotate so that the motor plungers are moved along the motor swash plate member 31 from the top dead center to the bottom dead center by the axially outward pushing force.

In order to perform such a driving for rotation, correspondingly to the reciprocation of the motor plungers 33 in the range from the position where it is pushed out most to the outer side (bottom dead center) to the position where it is pushed in most to the inner side (top dead center) attendant on the rotation of the motor cylinder 32, the motor-side cam ring 54 reciprocates the motor-side spools 55 in the radial directions. When the motor cylinder 32 is driven to rotate in this manner, the motor plungers are moved by being pushed inwards when moved along the motor swash plate member 31 from the bottom dead center to the top dead center attendant on the rotation, whereby the working oil in the motor oil chambers 33a is fed from the motor openings 32b into the inside passage 56 through the motor-side communication passage 51d. The working oil thus fed into the inside passage 56 is sucked into the pump oil chambers 23a through the pump-side communication passage 51c and the pump openings 22b, as has been described above.

As is seen from the above description, when the pump casing 20 is driven to rotate under the rotational drive force of the engine E, the working oil is discharged from the hydraulic pump P into the outside passage 57, and is fed to the hydraulic motor M to drive the motor cylinder 32 to rotate. The working oil having driven the motor cylinder 32 to rotate is fed into the inside passage 56, and is sucked from the inside passage 56 into the hydraulic pump P. The hydraulic closed circuit for connecting the hydraulic pump P and the hydraulic motor M is thus composed of the distribution valve 50, the working oil discharged from the hydraulic pump P according to the rotation of the hydraulic pump P is fed through the hydraulic closed circuit to the hydraulic motor M to drive the hydraulic motor M to rotate, and, further, the working oil discharged after driving the hydraulic motor M is returned through the hydraulic closed circuit to the hydraulic pump P.

In this case, in the condition where the hydraulic pump P is driven by the engine E and the rotational drive force of the hydraulic motor M is transmitted to the wheels so that the vehicle runs, the outside passage 57 functions as a high pressure side oil passage, while the inside passage 56 functions as the low pressure side oil passage.

On the other hand, in the condition where the drive force of the wheels is transmitted to the hydraulic motor M and the rotational drive force of the hydraulic pump P is transmitted to the engine E so that an engine braking action is generated, such as in the case of downslope running, the inside passage 56 functions as the high pressure side oil passage, whereas the outside passage 56 functions as the low pressure side oil passage.

In this instance, the pump cylinder 22 and the motor cylinder 32 are connected to the transmission output shaft 6 and are rotated integrally together as one body, so that when the motor cylinder 32 is driven to rotate as above-mentioned, the pump cylinder 22 is also rotated together, whereby the relative rotating speed of the pump casing 20 and the pump cylinder 22 is reduced. Therefore, the relationship between the rotating speed Ni of the pump casing 20 and the rotating speed No of the transmission output shaft 6 (namely, the rotating speed of the pump cylinder 22 and the motor cylinder 32), in relation to pump volume Vp and motor volume Vm, is as the following formula (1):

[Numerical 1]

$$Vp \times (Ni - No) = Vm \times No \qquad (1).$$

The motor volume Vm can be continuously varied by such a control as to pivotally swing the motor swinging member 35 by the motor servo mechanism SV. Specifically, where the rotating speed Ni of the pump swash plate member 21 in the above formula (1) is constant, the control for continuously varying the motor volume Vm causes continuous variation of the rotation of the transmission output shaft 6; as seen from this, the motor swinging member 35 is swung by the motor servo mechanism SV to thereby vary the motor volume Vm, whereby a speed change control is performed.

Here, when a control to reduce the swinging angle of the motor swinging member 35 is conducted, the motor volume Vm is reduced, and, where the pump volume Vp is constant and the rotating speed Ni of the pump swash plate member 21 is constant in the relationship of the above formula (1), such a control that the rotation of the transmission output shaft 6 is increased so as to approach the rotating speed Ni of the pump swash plate member 21, namely, a continuously variable speed control to the top speed change stage, is achieved. When the motor swash plate angle is zero, i.e., the motor swash plate is in an upright state, a speed change ratio of Ni=No (top speed change ratio) is obtained theoretically, resulting in a hydraulic pressure lock condition where the pump casing 20 is rotated as one body with the pump cylinder 22, the motor cylinder 32 and the transmission output shaft 6, and a mechanical transmission of power is performed.

In the hydrostatic continuously variable transmission CVT configured as above, when the inside passage 56 and the outside passage 57 are communicated with each other, the supply of the oil through both the passages 56 and 57 is not conducted, whereby the transmission of power between the hydraulic pump P and the hydraulic motor M can be interrupted. In other words, a clutch control can be achieved by controlling fluid communication between the inside passage 56 and the outside passage 57.

A clutch device CL for performing this clutch control is provided in the hydrostatic continuously variable transmission CVT according to the present invention, and the clutch device CL will be described below.

Figure 3:
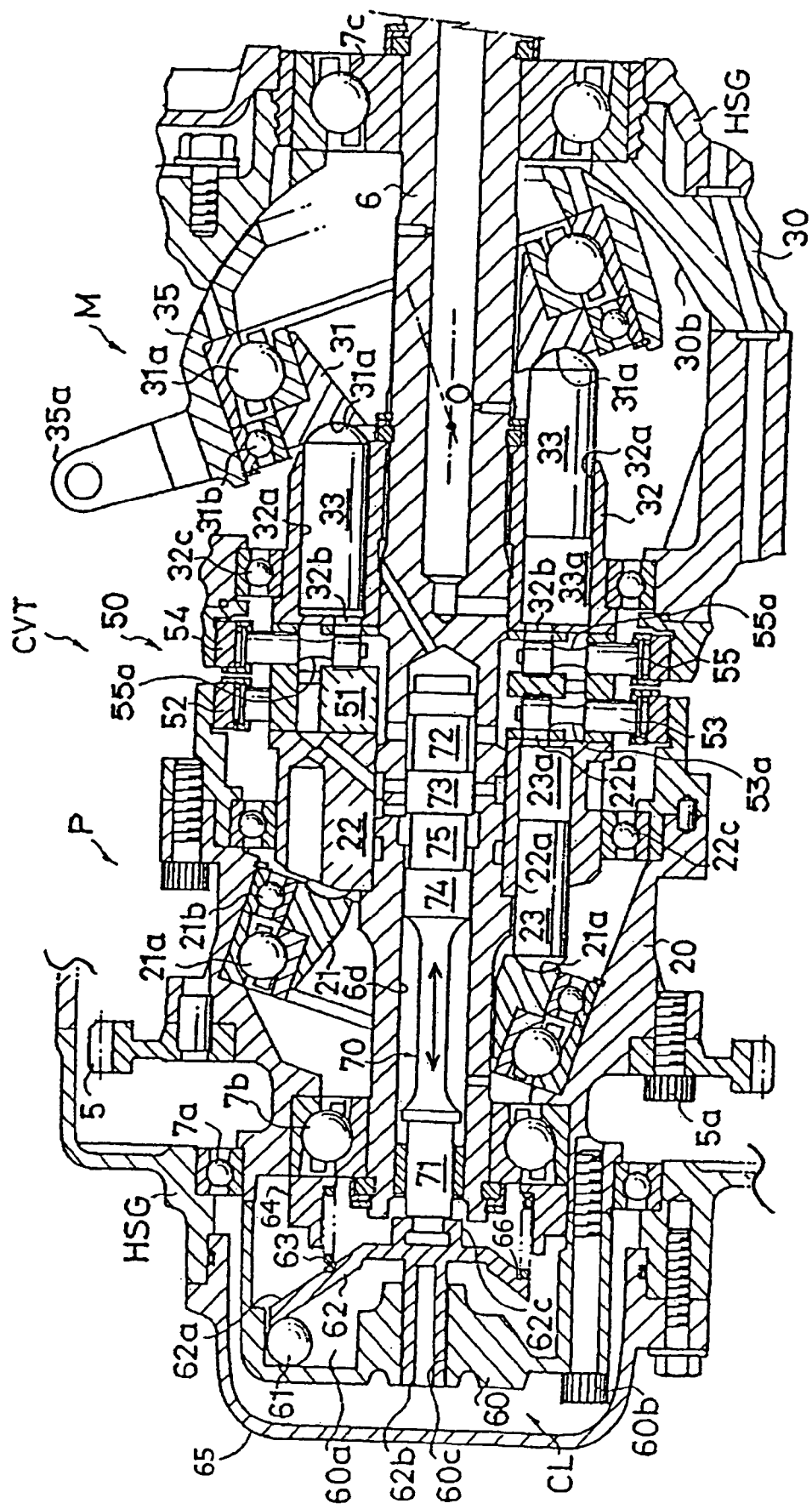
FIG. 3 is a sectional view showing the configuration of the hydrostatic continuously variable transmission according to the present invention.

As seen in FIGS. 1 and 3, the clutch device CL includes a rotatable, substantially cup-shaped clutch cap 60, connected to an end portion of the pump casing 20 by a bolt 60b. The clutch cap 60 has an interior surface with a plurality of radially extending guide grooves 60a formed therein. The clutch cap 60 has a through hole 60c formed substantially centrally therethrough, and is thickened in the area surrounding the through hole, as shown, to provide strength and reinforcement thereto.

The clutch device CL also includes a plurality of weights 61 (balls or rollers) respectively accommodated in the radially extending guide grooves 60*a* in the inside surface of the clutch cap 60. Each guide groove 60*a* is provided with a corresponding weight 61 therein.

The clutch device CL also includes a pressure-receiving, substantially disk-shaped clutch member 62, disposed in the interior space of the clutch cap 60, and including a plurality of radially extending arm portions 62*a*, disposed extending skewly in the respective guide grooves 60*a*, as shown. The clutch member 62 also has a lock portion 62*c* extending inwardly at an inner central portion thereof, and has a hollow cylindrical end portion 62*b* extending outwardly at an outer central portion thereof, opposite the lock portion 62*c*. The inwardly-facing surface of the clutch member 62 has a relatively shallow circular groove 66 (FIG. 3) formed therein, to receive an outer end of a spring 63.

The clutch device CL also includes a spring 63 for urging the clutch member 62 outwardly, so that the outer ends of the the arm portions 62*a* tend to displace the weights 61, and to push them radially inwardly in the guide grooves 60*a*. The inner end of the spring 63 fits into and is supported by a socket formed in a spring seat 64, which is provided at an outer end of the pump casing 20, coaxially surrounding the outer end of the support shaft 6, as shown. The outer end of the spring 63 fits engagingly into the circular groove 66 of the clutch member 62.

The clutch device CL further includes a valve spool 70, lockably connected to the lock portion 62*c* on the inside surface of the clutch member 62. The valve spool 70 is slidably disposed in, and is axially movable in the inner bore 6*d* of the support shaft 6, with a limited range of travel, as suggested by the two-headed arrow in FIGS. 1 and 3. It will be seen from the drawing that the valve spool 70 is operatively attached to the clutch member 62, for concurrent axial movement therewith.

A dust cover 65 is also provided attached to the housing HSG for protectively covering the clutch device CL. A bolt or other suitable fastener may be used to connect the dust cover 65 to the housing HSG, as shown.

As noted above, the clutch cap 60 is provided with a central through-hole 60*c*, with the rotational center axis as a center thereof, and the hollow cylindrical end portion 62*b* of the clutch member 62 is movably inserted in the through-hole 60*c*, so that the clutch member 62 is slidably movable in the axial direction. Therefore, when the pump casing 20 is in a still (non-rotating) state, and the clutch cap 60 is also not being rotated, an urging force applied to the clutch member 62, by the spring 63, causes the arm portions 62*a* to push the weights 61 into the guide grooves 60*a*. In this instance, since the arm portions 62*a* are skewly extending as shown in the figure, the weights 61 are pushed radially inwardly, and the clutch member 62 is in a leftwardly moved condition, with the tip of the hollow cylindrical portion 62*b* extending out beyond the clutch cap 60, as shown in FIG. 1.

Starting from this condition, with the pump casing 20 driven to rotate, and with the clutch cap 60 also rotated, as the rotary speed of the unit increases, the weights 61 are increasingly pushed radially outwardly in the guide grooves 60*a* by centrifugal forces. With the weights 61 pushed radially outwardly by the centrifugal forces, when the rotary speed of the clutch cap reaches a predetermined threshold level, the weights 61 push against the arm portions 62*a* with sufficient force to overcome the pressure from the spring 63, and the clutch member 62 is then moved rightwards by the weights 61, acting against the urging force of the spring 63.

The amount of rightward movement of the clutch member 62 varies according to the centrifugal forces acting on the weights 61, namely, according to the rotating speed of the pump casing 20, and, when the rotating speed is greater than or equal to the predetermined threshold speed, the clutch member 62 is moved rightwards, to the position shown in FIG. 3.

The valve spool 70, locked on a lock portion 62*c* of the clutch member 62, is fitted in the hollow internal bore 6*d*, opening at an end portion of the transmission output shaft 6 and extending in the axial direction. The valve spool 70 is slidably movable to the left and right in the axial direction, together with the clutch member 62.

As will be understood from the above discussion, the clutch cap 60, the weights 61 and the clutch member 62 cooperate to define a centrifugal force conversion mechanism, to which the spring 63 is added to constitute a governor mechanism.

Figure 5:
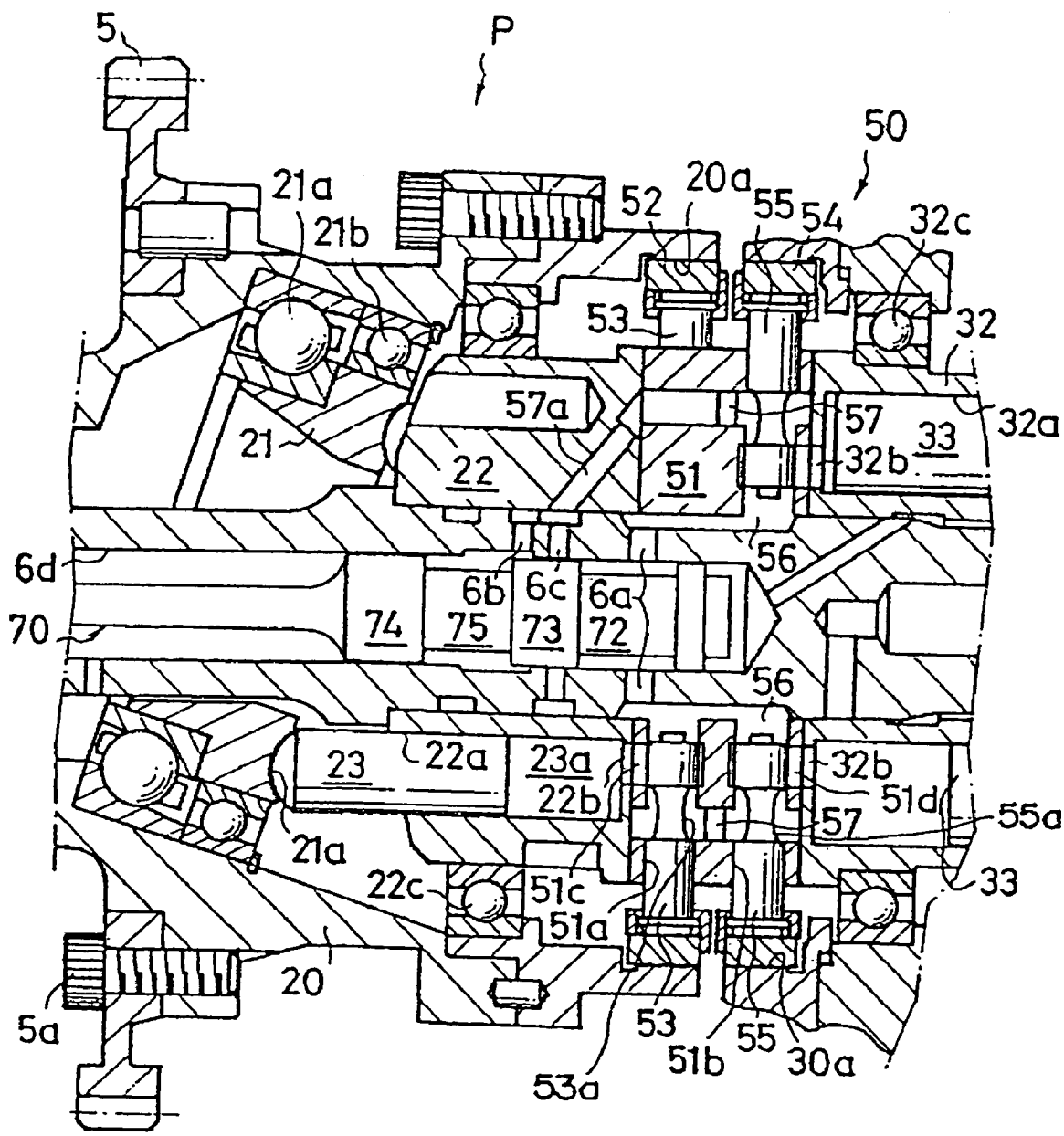
FIG. 5 is a sectional view showing enlargedly a part of the hydrostatic continuously variable transmission according to the present invention.

On the other hand, as shown in detail in FIGS. 4 and 5, the transmission output shaft 6, provided with the hollow internal bore 6*d*, is also provided with an inside branch passage 6*a* branched from the inside passage 56 and connected to the hollow internal bore 6*d*, and outside branch passages 6*b* and 6*c* connected from a communication passage 57*a*, which is branched from the outside passage 57, to the hollow internal bore 6*d*.

FIG. 4 corresponds to FIG. 1, representing a static or slow rotary speed condition, and shows the condition where the clutch member 62 has been moved leftwards (outwardly) by the spring 63, and the valve spool 70 has been moved leftwards (outwardly) therewith. In the condition illustrated in FIG. 4, the inside branch passage 6*a* and the outside branch passage 6*c* are allowed to be in fluid communication with each other through a right groove portion 72 of the valve spool 70, and the inside passage 56 and the outside passage 57 are also allowed ot communicate with each other. This causes the clutch to be disengaged.

On the other hand, FIG. 5 corresponds to FIG. 3, representing a relatively high rotary speed condition, and shows the condition where the clutch member 62 has been moved rightwards (inwardly), overcoming the force of the spring 63, and the valve spool 70 has also been moved rightwards (inwardly). In this condition, the communication between the inside branch passage 6*a* and the outside branch passage 6*c* is blocked and interrupted by the central land portion 73 of the valve spool 70, and the fluid communication between the inside passage 56 and the outside passage 57 is also interrupted thereby. This causes the clutch to be engaged.

Returning now to the low-speed/static configuration shown in FIGS. 1 and 4, since the valve spool 70 is moved leftwards in the rotation stopped condition of the pump casing 20 as mentioned above, the inside branch passage 6*a* and the outside branch passage 6*c* are communicated with each other in this instance, whereby the transmission of power between the hydraulic pump P and the hydraulic motor M is interrupted, resulting in that the clutch is disengaged.

Starting from this condition, with the pump casing 20 driven to rotate, the clutch member 62 is gradually moved rightwards by the centrifugal force acting on the weights 61 according to the rotating speed of the pump casing 20, and the valve spool 70 is also moved rightwards together with the clutch member 62. As a result, the communication between the inside branch passage 6*a* and the outside branch passage 6c is gradually interrupted by the central land portion 73 of the valve spool 70, and the clutch is gradually engaged.

In the hydrostatic continuously variable transmission CVT according to the present embodiment, when the pump casing 20 is driven to rotate by the engine E, the valve spool 70 is moved leftwards to release the clutch while the engine speed is low (idling time), and the clutch is gradually engaged as the engine speed rises.

In addition, the outside diameter d1 of the central land portion 73 in the valve spool 70 and the outside diameter d2 of the left land portion 74 are so set that d1<d2. Therefore, when the valve spool 70 is moved rightwards to connect the clutch, the hydraulic pressure in the outside passage 57 which acts in the left groove portion 75 of the valve spool 70 acts in the direction for moving the valve spool 70 leftwards. The leftward pushing force corresponds to the magnitude of the hydraulic pressure acting on the left groove portion 75 and to the pressure receiving area difference due to the difference between the outside diameters d1 and d2. Although the pressure receiving area difference is constant, the hydraulic pressure acting on the left groove portion 75 is the hydraulic pressure in the outside passage 57, and varies according to the drive force; specifically, the hydraulic pressure is higher as the drive force is greater. This configuration corresponds to a hydraulic pressure generating mechanism.

As is seen from this, the clutch connection control by use of the movement of the valve spool 70 is performed according to the balance (Fgov⇌Fp+Fspg) among the centrifugal force (Fgov) generated by the weights 61 in correspondence with the rotating speed of the pump casing 20, the urging force (Fspg) of the spring 63, and the pushing force (Fp) due to the hydraulic pressure acting on the left groove portion 75 of the valve spool 70. Specifically, a control is performed for connecting the clutch according as the rotating speed of the pump casing 20 is raised, and a control is conducted for giving a force in the direction for releasing the clutch according as the hydraulic pressure in the outside passage 57 rises (according as the drive force transmitted from the hydraulic pump P to the hydraulic motor M increases).

Figure 6:
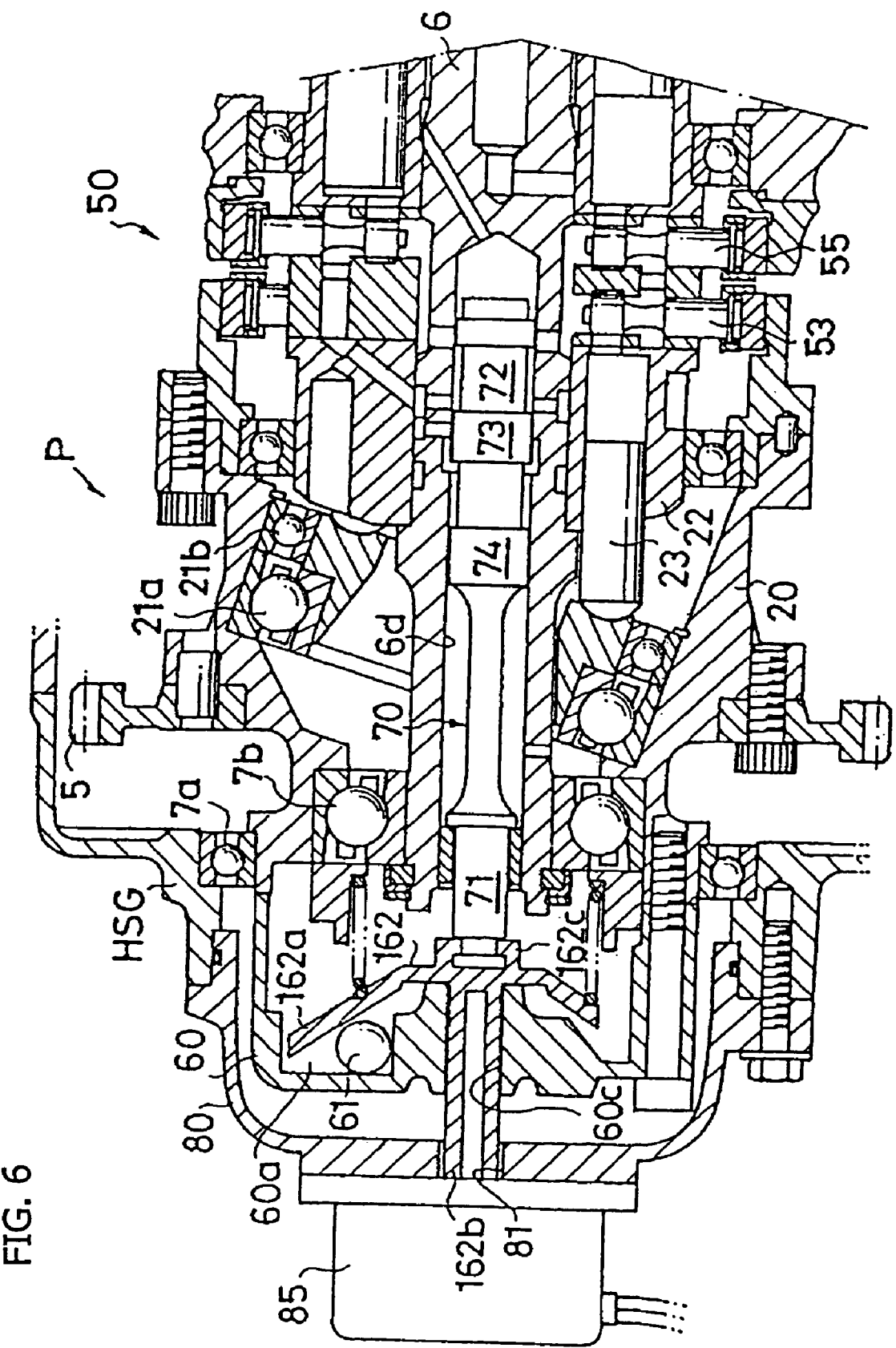
FIG. 6 is a sectional view showing the configuration of a hydrostatic continuously variable transmission according to a second illustrative embodiment of the present invention.

Next, a hydrostatic continuously variable transmission according to a second embodiment of the present invention will be described, referring to FIG. 6. The transmission differs from the above embodiment only in the configuration of the clutch member 162 constituting the clutch device CL and in that it includes a forcible clutch engagement apparatus 85, for forcibly moving the clutch member 162 rightwards to engage the clutch. Other configurations of the transmission in the second embodiment are the same as those described above in connection with the transmission according to the first embodiment; therefore, the same components as in the above transmission are denoted by the same symbols as above, and description thereof is omitted.

The clutch member 162 is in substantially the same shape as the clutch member 62 according to the first embodiment described above, and differs from the clutch member 62 only in that the hollow cylindrical portion 162b extends further left than in the first embodiment. The hollow cylindrical portion 162b extending in this way passes through a through-hole 81 formed in a modified dust cover 80, to protrude outwardly beyond the dust cover. On the other hand, the forcible clutch engagement apparatus 85 is mounted to the cover 80, the hollow cylindrical portion 162b projects into the forcible clutch engagement apparatus 85, and, at the time of operation, it is forcibly pushed rightwards by the forcible clutch engagement apparatus 85. The forcible clutch engagement apparatus 85 can include a solenoid which is operable, when energized, to push the hollow cylindrical portion 162b rightwards by the application of an electromagnetic force, and the hollow cylindrical portion 162b is urged leftwards by the spring 63, under the condition where the electromagnetic force is not applied.

The forcible clutch engagement apparatus 85 is not operated at the time of usual operation, and the clutch device CL performs the same clutch connection control as in the first embodiment described above. Under predetermined operating conditions, the forcible clutch engagement apparatus 85 is operated to forcibly move the clutch member 162 rightwards, thereby forcibly moving the valve spool 70 rightwards, whereby the clutch is connected. One example of the condition for operating the forcible clutch engagement apparatus 85 is the case of downslope running, in the condition where the engine rotation is idling and the clutch is released; in such an instance, the valve spool 70 is forcibly moved rightwards by the forcible clutch engagement apparatus 85 so as to engage the clutch, thereby providing an engine brake effect, to help control vehicle speed.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. In a hydrostatic continuously variable transmission of the type comprising a support shaft, a hydraulic pump and a hydraulic motor respectively mounted on the support shaft, connected to each other through a hydraulic closed circuit, and wherein the capacity of said hydraulic motor is variably controlled to modify a speed of input rotation of said hydraulic pump and to transmit the speed-modified rotation as an output rotation of said hydraulic motor, the improvement comprising a clutch apparatus integrated into said transmission, said clutch apparatus comprising:

a hollow internal bore extending axially inside said support shaft;

a valve spool which is slidably disposed in said internal bore of said support shaft, and which operates to allow or to interrupt fluid communication between a high pressure side oil passage and a low pressure side oil passage of said hydraulic closed circuit, according to the position thereof;

a rotatable clutch cap operatively attached to said hydraulic pump; and a governor mechanism which is operatively associated with said clutch cap, and which operates to generate a governor force corresponding to a rotating speed of said clutch cap by use of a centrifugal force generated by rotation of said clutch cap; wherein said valve spool is moves in said internal bore in response to said governor force generated by said governor mechanism during the operation of said clutch device.

2. A clutch device for a hydrostatic continuously variable transmission as set forth in claim 1, wherein said governor mechanism comprises:

a centrifugal force conversion mechanism for converting said centrifugal force generated by the rotation of said clutch cap into said governor force, and which operates to axially apply said governor force to said valve spool so as to move said valve spool and to interrupt the communication between said high pressure side oil passage and said low pressure side oil passage;

a spring urging said valve spool in a direction establishing communication between said high pressure side oil passage and said low pressure side oil passage, and a hydraulic force generating mechanism applying a pushing force to said valve spool in the axial direction generated by the hydraulic pressure inside said high pressure side oil passage so as to move said valve spool in the direction establishing communication between said high pressure side oil passage and said low pressure side oil passage.

3. A clutch device for a hydrostatic continuously variable transmission as set forth in claim 1, wherein said support shaft is provided with high pressure and low pressure branch passages communicated respectively with said high pressure side oil passage and said low pressure side oil passage of said hydraulic closed circuit, wherein:

said high pressure and low pressure branch passages are opened into said internal bore, and said valve spool is moves in said internal bore to make or interrupt the communication between said high pressure and low pressure branch passages, and thereby to make or interrupt the communication between said high pressure side oil passage and said low pressure side oil passage.

4. A clutch device for a hydrostatic continuously variable transmission as set forth in claim 1, comprising a forcible operation device selectively moving said valve spool in said internal bore irrespective of said governor force generated from said governor mechanism.

5. A clutch device for a hydrostatic continuously variable transmission as set forth in claim 4, wherein during the operation said forcible operation device operates to forcibly moves said valve spool in said internal bore so as to interrupt the communication between said high pressure side oil passage and said low pressure side oil passage when the rotary speed of an engine for driving said hydraulic pump is low, and the rotary speed of a wheel driven by said hydraulic motor is high.

6. A clutch device for a hydrostatic continuously variable transmission as set forth in claim 2, wherein the centrifugal force conversion mechanism comprises:

a clutch member operatively attached to the valve spool and having angled arm portions extending outwardly thereon;

said clutch cap having an interior surface with a plurality of raidially oriented guide grooves formed therein, each of said guide grooves having an arm portion of the clutch member operatively associated therewith; and a plurality of weights, one of said weights provided for each of the respective guide grooves of said clutch cap.

7. A clutch device for a hydrostatic continuously variable transmission as set forth in claim 6, wherein the clutch member is operatively attached to an outer end portion of said valve spool.

8. A clutch device for a hydrostatic continuously variable transmission as set forth in claim 6, wherein the clutch cap is provided with a through-hole formed substantially centrally therein, and a cylindrical end portion of the clutch member is slidably inserted in the through-hole, so that the clutch member is slidably axially moves relative to the clutch cap during the operation of said clutch device.

9. A hydrostatic continuously variable transmission and clutch assembly, comprising:

a support shaft having a hollow internal bore extending axially therein;

a hydraulic pump and a hydraulic motor respectively mounted on the support shaft, connected to each other through a hydraulic closed circuit, and wherein the capacity of said hydraulic motor or of said hydraulic pump is variably controlled to modify a rotary input fed into said hydraulic pump and to transmit the modified input as a rotary output of said hydraulic motor, wherein said hydraulic pump comprises a pump casing; and a clutch apparatus integrated into said transmission, said clutch apparatus comprising:

a valve spool which is movably disposed in said internal bore of said support shaft, and which operates to allow or to interrupt fluid communication between a high pressure side oil passage and a low pressure side oil passage of said hydraulic closed circuit, according to the position thereof;

a rotatable clutch cap operatively attached to said hydraulic pump; and a governor mechanism which is operatively associated with said clutch cap, and which operates to generate a governor force corresponding to a rotating speed of said clutch cap by use of a centrifugal force generated by rotation of said clutch cap; wherein said valve spool moves in said internal bore in response to said governor force generated by said governor mechanism.

10. A hydrostatic continuously variable transmission and clutch assembly as set forth in claim 9, wherein said governor mechanism comprises:

a centrifugal force conversion mechanism which converts said centrifugal force generated by the rotation of said clutch cap into said governor force in an axial direction, and which operates to axially apply said governor force to said valve spool so as to move said valve spool and to interrupt the communication between said high pressure side oil passage and said low pressure side oil passage, a spring urging said valve spool in a direction establishing communication between said high pressure side oil passage and said low pressure side oil passage, and a hydraulic force generating mechanism which applies a pushing force to said valve spool in the axial direction generated by the hydraulic pressure inside said high pressure side oil passage so as to move said valve spool in the direction establishing communication between said high pressure side oil passage and said low pressure side oil passage.

11. A hydrostatic continuously variable transmission and clutch assembly as set forth in claim 9, wherein said support shaft is provided with high pressure and low pressure branch passages communicated respectively with said high pressure side oil passage and said low pressure side oil passage constituting said hydraulic closed circuit, said high pressure and low pressure branch passages are opened into said internal bore, and said valve spool moves in said internal bore to make or interrupt the communication between said high pressure and low pressure branch passages, and thereby to make or interrupt the communication between said high pressure side oil passage and said low pressure side oil passage.

12. A hydrostatic continuously variable transmission and clutch assembly as set forth in claim 9, wherein, during the operation a forcible operation device forcibly moves said valve spool in said internal bore irrespective of said governor force generated from said governor mechanism.

13. A hydrostatic continuously variable transmission and clutch assembly as set forth in claim 12, wherein said forcible operation device selective to forcibly moves said valve spool in said internal bore so as to interrupt the communication between said high pressure side oil passage and said low pressure side oil passage when the rotary speed of an engine driving said hydraulic pump is low, and the rotary speed of a wheel driven by said hydraulic motor is high.

14. A hydrostatic continuously variable transmission and clutch assembly as set forth in claim 10, wherein the centrifugal force conversion mechanism comprises:
   a clutch member operatively attached to the valve spool and having angled arm portions extending outwardly thereon;
   said clutch cap having an interior surface with a plurality of raidially oriented guide grooves formed therein, each of said guide grooves having an arm portion of the clutch member operatively associated therewith; and
   a plurality of weights, one of said weights provided for each of the respective guide grooves of said clutch cap.

15. A hydrostatic continuously variable transmission and clutch assembly as set forth in claim 14, wherein the clutch member is operatively attached to an outer end portion of said valve spool.

16. A hydrostatic continuously variable transmission and clutch assembly as set forth in claim 14, wherein the clutch cap is provided with a through-hole formed substantially centrally therein, and a cylindrical end portion of the clutch member is movably inserted in the through-hole, so that, during the operation, the clutch member is slides in the axial direction relative to the clutch cap.

17. A hydrostatic continuously variable transmission and clutch assembly as set forth in claim 14, wherein said weights are substantially spherical in shape.

18. A hydrostatic continuously variable transmission and clutch assembly, comprising:
   a support shaft having a hollow internal bore extending axially therein;
   a hydraulic pump and a hydraulic motor respectively mounted on the support shaft, connected to each other through a hydraulic circuit, and configured so that the capacity of said hydraulic motor or of said hydraulic pump is variably controlled to modify a rotary input fed into said hydraulic pump and to transmit the modified input as a rotary output of said hydraulic motor, wherein said hydraulic pump comprises a pump casing; and
   a clutch apparatus integrated with said transmission, said clutch apparatus comprising:
   a valve spool which is slidably disposed in said internal bore of said support shaft, and which operates to allow or to interrupt fluid communication between a high pressure side oil passage and a low pressure side oil passage of said hydraulic closed circuit, according to the position thereof;
   a rotatable clutch cap operatively connected to an end portion of said pump casing and having a plurality of guide grooves formed in an interior surface thereof, said clutch cap having a through hole formed substantially centrally therein;
   a plurality of weights disposed in said clutch cap, one of said weights provided for each of the respective guide grooves of said clutch cap;
   a clutch member disposed inside of the clutch cap and comprising a plurality of arm portions, with a respective arm portion extending radially outwardly proximate each of said guide grooves, an inner end of said clutch member being operatively attached to an end of said valve spool, and an outer end of said clutch member comprising a cylindrical end portion which fits slidably in the through hole of said clutch cap; and
   a spring disposed between said clutch member and said pump casing urging said clutch member outwardly;
   wherein the spring urges the arm portions of the clutch member outwardly and to thereby pushes the weights radially inwardly in the guide grooves, maintaining the valve spool in a first orientation thereof, when the rotary speed of the pump casing is below a threshold speed.

* * * * *